Dec. 19, 1933.  A. Y. DODGE  1,940,449

BRAKE

Filed March 21, 1932

INVENTOR.
Adiel Y. Dodge
BY H. Fowler
ATTORNEY

Patented Dec. 19, 1933

1,940,449

UNITED STATES PATENT OFFICE 1,940,449

BRAKE

Adiel Y. Dodge, South Bend, Ind., assignor to Bendix Aviation Corporation, South Bend, Ind., a corporation of Delaware Application March 21, 1932. Serial No. 600,332

9 Claims. (Cl. 188—218)

This invention relates to brakes and more particularly to vibration dampers therefor.

In the automotive industry, considerable difficulty has been experienced in dampening the audible vibrations set up in the backing plates through the frictional engagement of the shoes with the drum. These audible vibrations occur at certain periods of vibration of the backing plate and produce a drum or squeak, which is exceedingly annoying and objectionable. The present invention aims to overcome these objections.

An object of the invention is to provide means for dampening the vibrations of a brake.

Another object of the invention is to provide means for dampening vibrations in a backing plate of a brake, such vibrations being set up through the frictional engagement of the shoes with the drum.

Another object of the invention is to provide means associated with the backing plate of a brake for dampening audible vibrations produced in the plate through frictional engagement of the shoes with the drum.

A further object of the invention is to dampen audible vibrations by setting up stresses in the vibrating member.

A further object of the invention is to dampen the audible vibrations of a member by imposing pressure on the member.

Yet a further object of the invention is to provide means for dampening the audible vibrations of a member by imposing pressure on the member and varying the pressure to dampen the audible vibrations occurring at different periods of vibration of the member.

An additional object of the invention is the provision of a device for dampening vibrations, which is simple and inexpensive in structure, highly efficient in use, positive in action, durable in service and a general improvement in the art.

Other objects of the invention will appear from the following description taken in connection with the drawing which forms a part of this specification, and in which.

Figure 1:
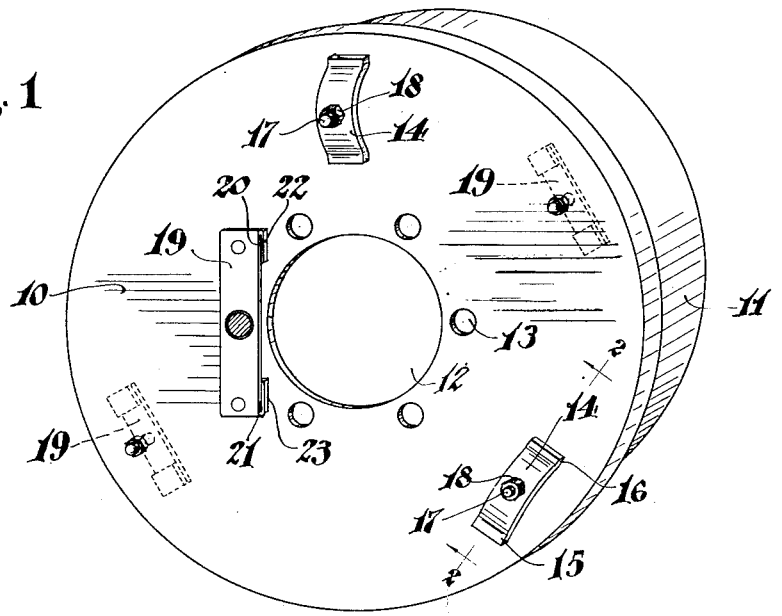
Figure 1 is a perspective view of a brake drum illustrating the invention as applied.
Figure 2:
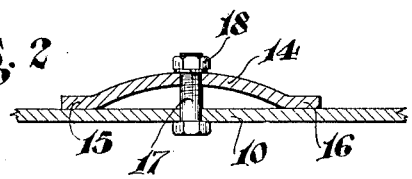
Figure 2 is an enlarged sectional view substantially on line 2—2 of Figure 1.

Referring to the drawing for more specific details of the invention, 10 represents a backing plate having associated therewith the conventional brake drum 11. The plate 10 is provided with the usual central aperture 12 having arranged in spaced relation adjacent thereto a plurality of apertures 13 adapted to receive bolts by which the plate may be suitably secured in position.

Positioned on the plate preferably adjacent the perimeter thereof is a pressure member 14. As shown, the pressure member comprises a strip of metal having a two point bearing on the backing plate. The pressure plate 14 is so formed that its respective ends are in a common plane as indicated at 15 and 16 and its body portion is bent or curved to space the body portion of the pressure plate from the backing plate. This pressure plate is bored preferably centrally between its respective ends to receive a bolt 17 which extends through the backing plate and the bolt is provided with the conventional nut 18, by means of which pressure between the backing plate and the pressure plate may be increased or decreased at will, the objects of which will hereinafter appear.

If preferred, the pressure plate may be formed from a strip 19. The respective ends of the strip are bent upon the strip at 20 and 21 and have suitably secured thereto blocks 22 and 23 adapted to bear against the backing plate. As shown, the pressure blocks may be positioned on either side of the backing plate.

Figure 3:
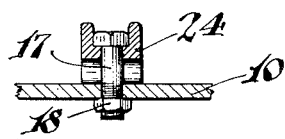
Figure 3 is an enlarged cross sectional view of a portion of the backing plate illustrating a modified form of the invention as applied.

Figure 3 illustrates a modification of the invention wherein the pressure member 14 is formed from a channel member 24 so that greater strength and rigidity may be had. This form also provides means for housing the head of the bolt, so that the bolt may be held against rotation. In this type, greater pressure may be obtained between the backing plate and the pressure member because of the rigidity of the pressure member.

It has been found that the backing plate is caused to vibrate through pressure applied to the drum through the shoes and that the vibration sets up an audible vibration at a certain period. These periods of audible vibration vary due to the wear imposed on the shoe and brake drum through their frictional engagement. As this wear becomes apparent, the period of audible vibrations change from time to time and, accordingly, it is desirable to provide means for imposing stresses in the backing plate and to vary the stresses when required to check or dampen the vibrations, so that audible vibrations will not occur.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a backing plate, a vibration dampening member having a plurality of spaced bearing areas on the plate and variable means for securing the member to the plate intermediate the bearing areas.

2. A brake comprising a backing plate, a vibration dampening member having two spaced bearing areas on the plate and means intermediate the bearing areas for securing the member to the plate.

3. A brake comprising a backing plate, a channel member positioned on the plate, means for imposing a pressure between the channel member and the plate and means for varying the pressure between the channel member and the plate.

4. A brake comprising a backing plate, a channel member having a two point bearing on the plate, means for creating pressure between the member and the backing plate and means for varying the pressure between the member and the plate.

5. A brake comprising a backing plate, a channel member having a plurality of bearing points on the plate, means for creating a pressure between the channel member and the plate and means for varying the pressure between the channel member and the plate.

6. A brake comprising a backing plate, a channel member having two bearing points on the plate and means intermediate the bearing points for creating a pressure between the plate and member and means for varying the pressure between the plate and member.

7. A brake comprising a backing plate, a channel member having two bearing points on the plate and a bolt securing the member to the plate intermediate the bearing points.

8. A brake comprising a backing plate, a channel member having two bearing points on the plate, a bolt securing the member to the plate between the two bearing points, said bolt having its head in the channel member.

9. A brake comprising a backing plate, an arched metallic member having its ends in contact with the plate and having a portion intermediate its ends spaced from the plate, and adjustable means for pressing said portion toward the plate to thereby dampen the vibrations of the plate.

ADIEL Y. DODGE.